United States Patent [19]

Grant

[11] Patent Number: 4,789,376
[45] Date of Patent: Dec. 6, 1988

[54] GEAR TYPE SHAFT COUPLING

[75] Inventor: George G. Grant, Greer, S.C.

[73] Assignee: Reliance Electric Company, Greenville, S.C.

[21] Appl. No.: 382,148

[22] Filed: May 26, 1982

[51] Int. Cl.$^4$ .............................................. F16D 3/18
[52] U.S. Cl. ................................... 464/154; 464/159
[58] Field of Search ............... 464/147, 154, 156, 158, 464/159; 403/359, 301, 305

[56] References Cited

U.S. PATENT DOCUMENTS

| 1,260,495 | 3/1918 | Weier | 464/158 X |
| 1,486,549 | 3/1924 | Schuette | 403/305 |
| 2,986,908 | 8/1961 | Wilkerson | 464/154 |
| 3,174,302 | 3/1965 | Pomper | 464/154 |
| 3,605,439 | 9/1971 | Filepp | 464/156 |
| 4,317,337 | 3/1982 | Walden et al. | 403/305 X |

FOREIGN PATENT DOCUMENTS

| 724822 | 3/1980 | U.S.S.R. | 464/158 |
| 2033538 | 5/1980 | United Kingdom | 464/154 |

OTHER PUBLICATIONS

Flexible Couplings, Poole Engineering & Machine Co., 1929.
Fast's Self–Aligning Coupling, Koppers Company Inc., Copyright 1950 by Koppers Company Inc.
The New Waldron Series "A" Flexible Coupling, John Waldron Corporation, Catalog No. 57A, Jan. 1953.
Waldron Gear Couplings, Bulletin 712B, Nov. 1979.

Primary Examiner—Daniel P. Stodola
Attorney, Agent, or Firm—Dority & Manning

[57] ABSTRACT

A gear-type shaft coupling for connecting shafts in an end-to-end relation, in which there are two hubs mounted on the ends of the shafts and sleeves disposed on the hubs and having internal gearing for meshing with external gearing on the hubs. A ring overlaps and connects the two sleeves to form a rigid assembly for transmitting torque between the gear teeth of one hub and the gear teeth of the other hub. Bolts or screws extending radially connect the ring and the sleeves and, in several embodiments of the invention, the ring is segmented to permit the ring to be easily assembled in the coupling as the coupling is installed on the drive and driven machinery.

15 Claims, 4 Drawing Sheets

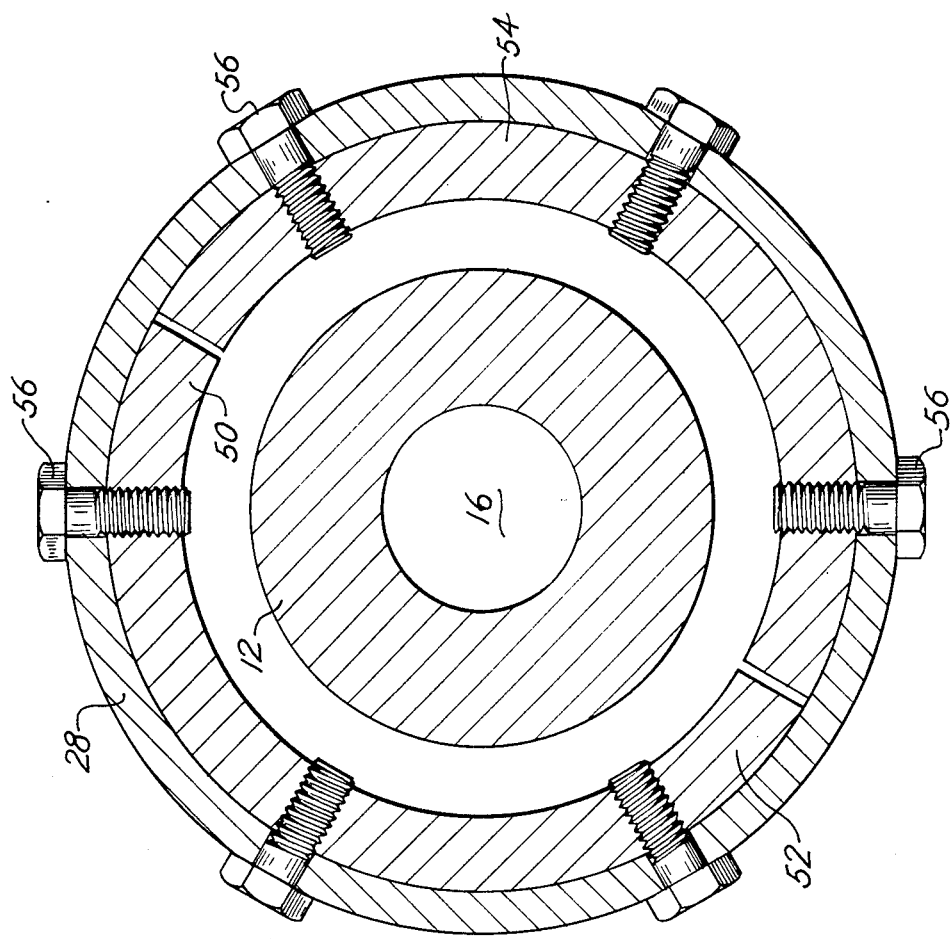
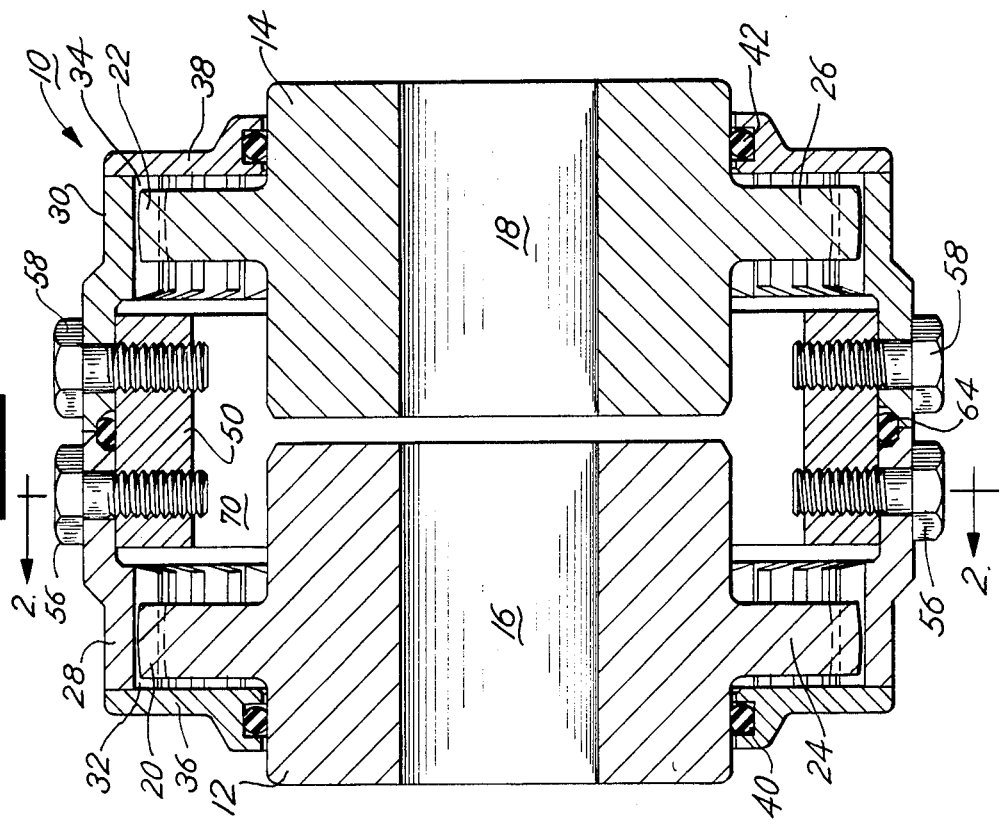

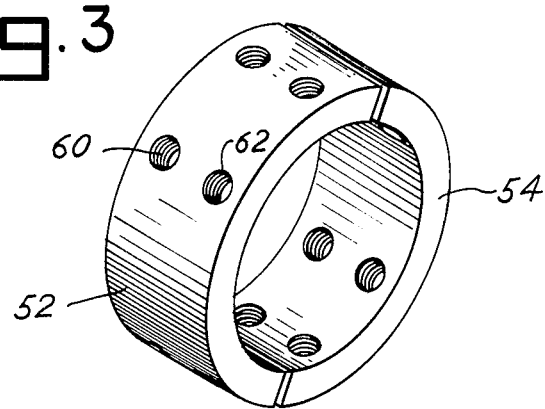
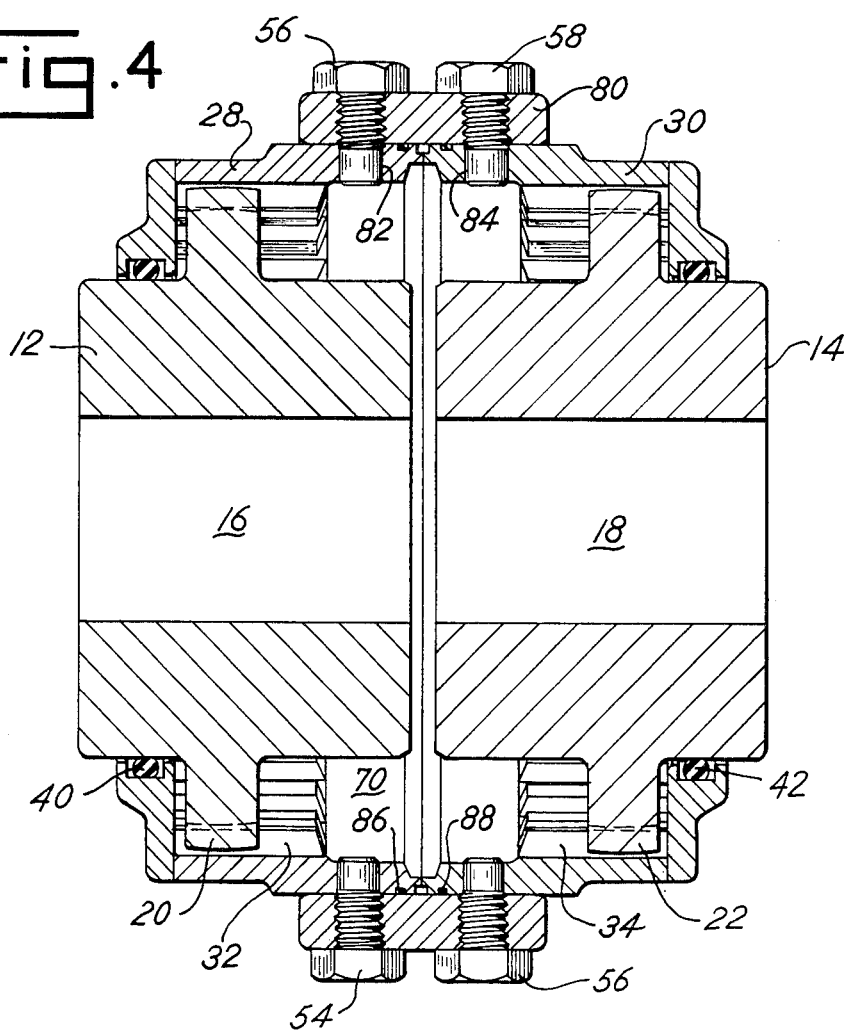

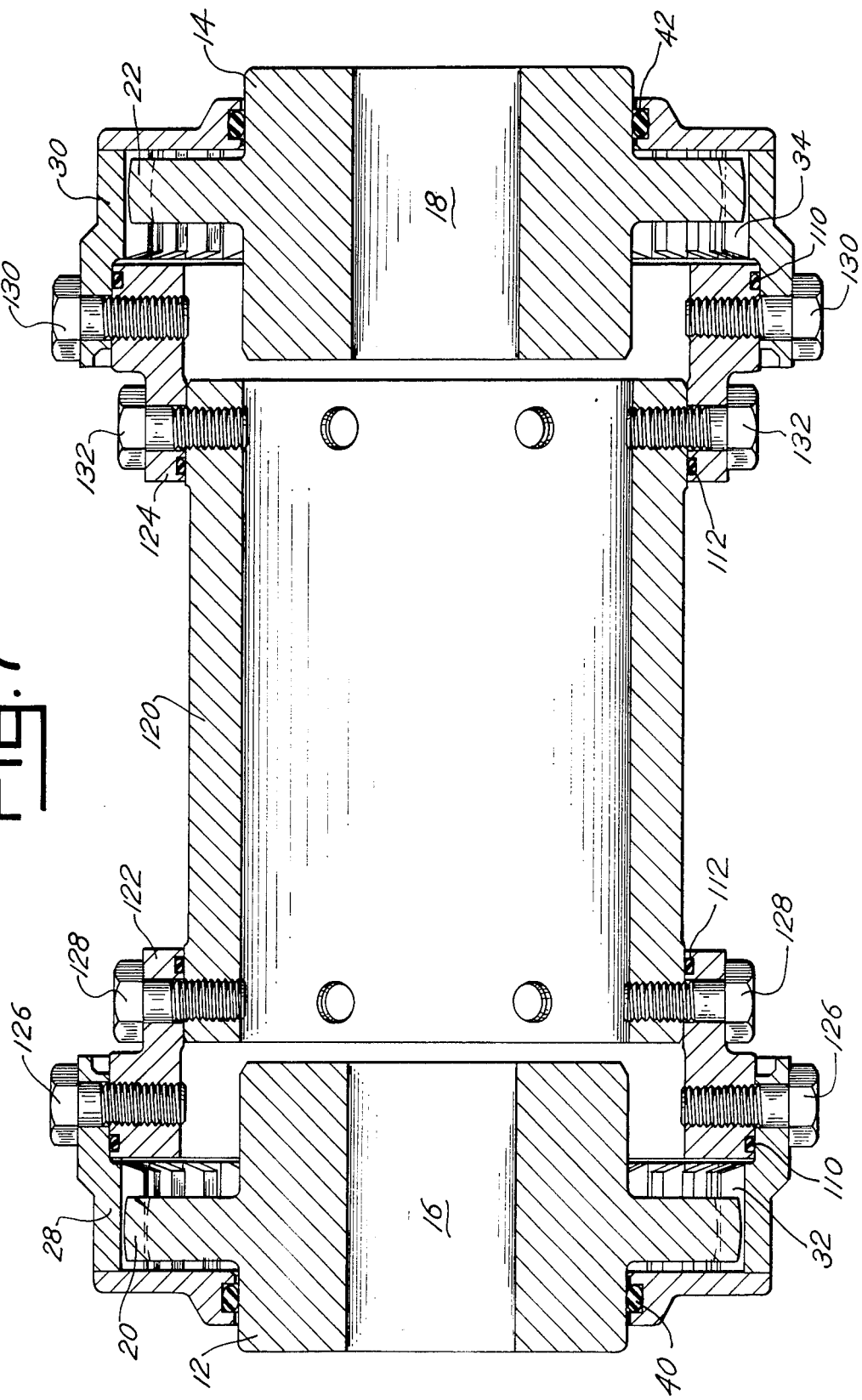

GEAR TYPE SHAFT COUPLING

BACKGROUND OF THE INVENTION

There are two basic types of gear couplings used for connecting rotating shafts in end-to-end relationship to transmit torque between two machines such as a drive motor and driven equipment. One type consists basically of gear hubs for the two shafts and two sleeves with internal gears meshing with the external gears on the hub for operationally connecting the hubs, and hence the shafts, to transmit the torque between the shafts. In this conventional type of gear coupling, the sleeves are provided with radially extending annular flanges at their center edges secured together by a plurality of bolts or screws spaced around the flanges. While this type of gear coupling is provided with a gear pitch diameter substantially larger than the normal diameter of the hub, and hence has a relatively large lubrication reservoir for either grease or oil, the bore capacity of the hubs is somewhat limited and the external diameter of the coupling is relatively large, thus limiting the applications of this type of coupling to installations in which the lateral space and centrifugal force are not critical limitations. In another basic type, which is essentially a modified version of the first one described, the hub diameter is larger, and hence provides a significant bore capacity; however, the capacity of the lubrication reservoir is relatively small and the seals are generally unreliable so that only grease lubrication can be safely used in the operation of the coupling. This type has the same type of radial flanges on the sleeves, and hence the same disadvantages as the first coupling with respect to size and centrifugal force. Notwithstanding the foregoing disadvantages of the two types of gear couplings described, these gear couplings have been extensively used in the mechanical power transmission field, since they have a relatively short axial length and require a short extension of the shaft beyond the machinery housing, thus minimizing shaft deflection and the load on the shaft bearings. Further, these types of gear couplings facilitate installation of the machinery and couplings by permitting the machinery to be installed in operating position relative to one another, with the shafts in proper alignment, and then the coupling connected without disturbing the precise operational relationship of the driving and driven machinery.

Another type of gear coupling has hubs similar to the hubs of the second type described above, but instead of using sleeves with radial flanges to interconnect the hubs, a single cylindrical sleeve is mounted on the hubs and internal gearing near each end meshes with the external gearing on the two hubs. While this type of gear coupling reduces the external diameter of the coupling, and hence reduces the centrifugal force as compared with the flange type coupling, the sleeve is relatively long axially and may prevent installation of the coupling after the machinery has been installed in final operating position. Further, the reservoir for lubrication is normally restricted, thus requiring frequent servicing to prevent premature failure of the coupling. However, the service life of this type and the flange type coupling is normally approximately the same when proper lubrication is maintained.

SUMMARY OF THE INVENTION

It is one of the principal objects of the present invention to provide a flexible gear-type shaft coupling that can be readily assembled in final operating position on two shafts in end-to-end relation after the drive and driven machines connected thereby have been precisely placed in operating position with respect to one another, and which is comparatively compact in structure and has a relatively large reservoir for grease and oil for effective lubrication of the gearing in the coupling.

Another object of the invention is to provide a gear coupling which has a large pitch diameter capable of reducing the forces generated in the coupling and lessening the loads imposed on the connected shafts and bearings, and which has an extended service life and an increased torque capacity as compared with the conventional flange-type gear coupling.

A further object of the invention is to provide a gear coupling of the aforesaid type which is relatively simple in construction and can be conveniently serviced in the field, and which can be easily manufactured from a wide variety of materials, and can be installed on the equipment with little likelihood of damaging the seals thereof. Other objects and advantages of the invention will become apparent from the following description and accompanying drawings.

The invention relates to a flexible gear shaft coupling having two hubs for mounting on the ends of two shafts in generally axial alignment, sleeves on the hubs with internal gearing for meshing with external gearing on the hubs, and a ring, normally a segmented or split ring, disposed either internally or externally of the sleeve and secured thereto, preferably by a plurality of bolts or screws extending through or into the sleeves and ring. Seals are normally provided between the sleeves and ring and between the sleeves and the respective hubs to retain the lubrication in the reservoir formed by the sleeves and hubs. The hubs and sleeves may be used with spacers of different lengths connected to the sleeves by rings interposed between the ends of the spacer and the respective sleeves, and one hub, sleeve and connecting ring may be used to form a gear coupling system having the intermeshing gears only at one end. Other changes and modifications may be made using the basic elements of the present invention.

BRIEF DESCRIPTION OF THE DRAWINGS

FIG. 1 is an axial cross sectional view of one embodiment of the gear type shaft coupling, illustrating the present invention;

FIG. 2 is a transverse cross sectional view of the coupling shown in FIG. 1, the section being taken on line 2—2 of the latter figure;

FIG. 3 is a perspective view of a segmented or split ring used in the construction of the coupling shown in the preceding figures;

FIG. 4 is an axial cross sectional view similar to that shown in FIG. 1, illustrating a modified form of the present invention;

FIG. 7 is a gear coupling utilizing the assembly shown in FIG. 6 for two shafts with a spacer between the two assemblies.

DETAILED DESCRIPTION OF THE PREFERRED EMBODIMENT

Figures 5, 6:
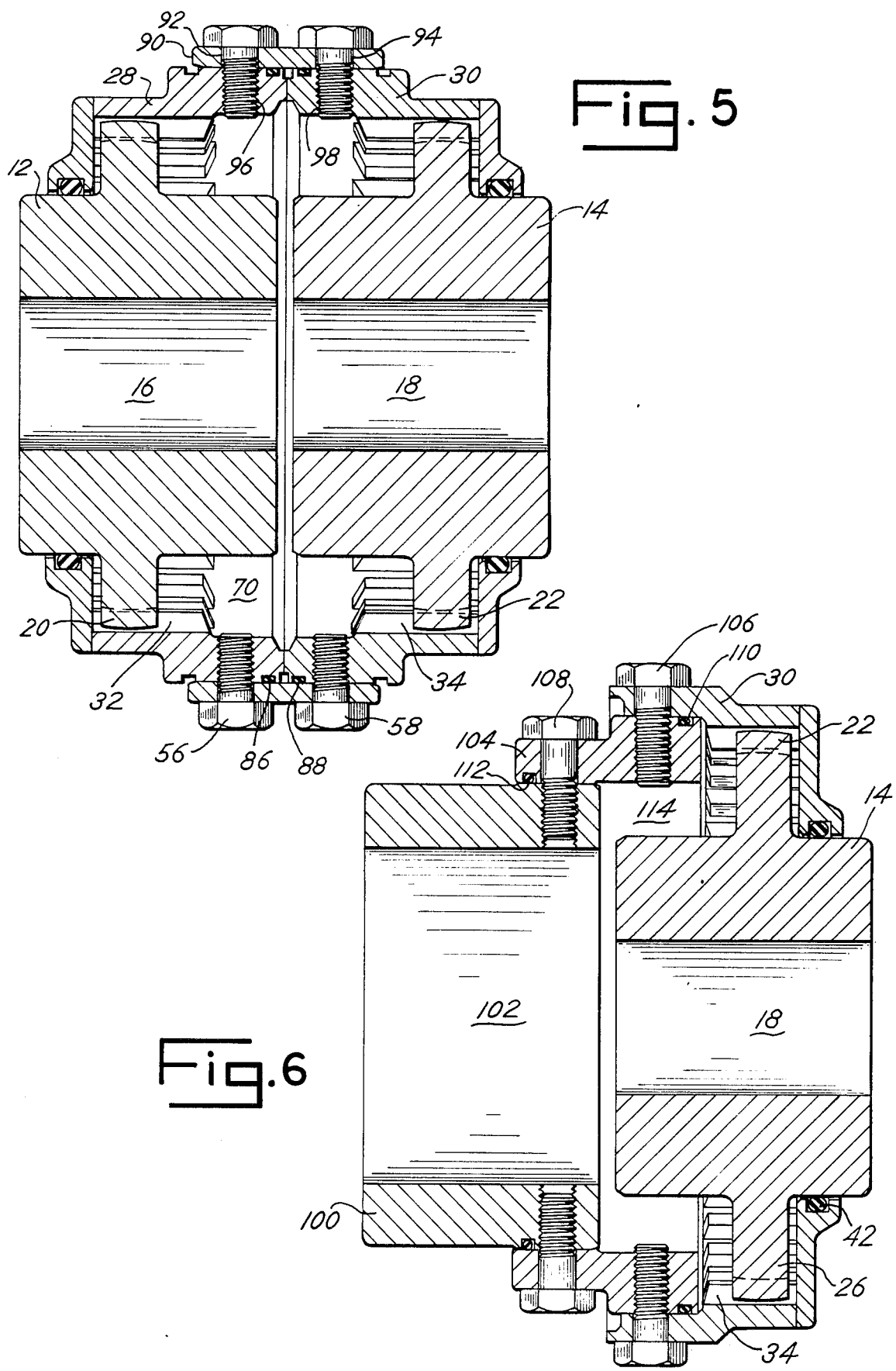
FIG. 5 is an axial cross sectional view similar to those shown in FIGS. 1 and 4, illustrating a further modified form of the invention.
FIG. 6 is an axial cross sectional view of a further modified form of the present invention, wherein a portion of the assembly shown in FIG. 1 is utilized in forming a half gear coupling.

Referring more specifically to the drawings, and to FIGS. 1 and 2 in particular, numeral 10 indicates generally a gear-type shaft coupling embodying the present invention, having hubs 12 and 14 with bores 16 and 18, respectively, for receiving shafts in an end-to-end relation of the drive and driven machinery. The bores may be of various sizes and may be adapted to be secured to the shafts by different types of attachment means.

The two hubs 12 and 14 have an annular set of gears 20 and 22 spaced outwardly from the periphery of the body portion of the hub by annular ribs 24 and 26 formed integrally with the hub body. The hubs are connected by sleeves 28 and 30, having gear sets 32 and 34 intermeshing with gear sets 20 and 22, respectively. The two sleeves have end rings 36 and 38, formed with or secured integrally to the two sleeves 28 and 30, and are provided with seals 40 and 42, consisting of an O-ring disposed in an annular groove in the inner edge of the end rings and seating on the external surface of the respective hub bodies.

The two sleeves 28 and 30 abut one another at the center, and are secured together by a segmented or split ring 50 having, in the embodiment shown, two segments 52 and 54. The sleeves and the two ring segments are provided with a plurality of radially extending holes for receiving bolts 56 and 58 extending through holes in the inner edges of the sleeves and into two pairs of holes 60 and 62 spaced around the periphery of the segmented ring. Each of the threaded holes in the segmented ring is matched with a corresponding unthreaded hole in the sleeve, so that when bolts are inserted and tightened in the holes, the sleeves and the rings become a rigid assembly with the sleeves being secured firmly to one another and with the gear sets on the sleeves meshing with the corresponding gear sets on the hubs. A seal 64 is preferably disposed between the two sleeves and the ring, in order to provide a closed space which forms a cavity for lubrication for the gear sets on the hubs and sleeves. The cavity is relatively large, and when the shafts are inserted in the respective bores, form an effective gear lubricating reservoir 70 for maintaining the gearing properly lubricated for extended periods of time. Since the sleeve assembly consists of two sleeves, they can be easily assembled along with the hubs as the hubs are mounted on the shafts, and the segmented rings can then be placed around the hubs between the gear sets 20 and 22 and secured to the sleeves 28 and 30 by the bolts, thus minimizing the amount of space required for assembling the coupling after the drive and driven shafts have been placed in operating position relative to one another. The segmented ring 50 is shown consisting of two segments; however, it may be in either three or four segments if desired, although the preferred embodiment is one consisting of two segments as shown in the drawings.

In the use and operation of the gear coupling just described, the hubs are placed on the shafts with the sleeves 28 and 30 disposed on the respective hubs. The machinery and the hubs are placed in their operating position relative to one another before or during this initial stage of the coupling assembly operation in order to facilitate proper alignment of the respective parts of the machinery and coupling. With the sleeves 28 and 30 withdrawn to the left and right from the center of the coupling, the two segments of ring 50 are inserted between the gear sets 20 and 22 in the position shown in FIG. 1. The sleeves are then moved toward one another until they are in contact at the center, and the two segments of the ring are secured to the sleeves by bolts 56 and 58 extending through the sleeves into the threaded holes in the ring. Before the ring is assembled in place, a gasket 64 is mounted on the ring and is entrapped in the groove between the inner edge of the two sleeves and the ring to form an effective seal between the sleeves and the segmented ring 50. After the screws have been tightened in place in the ring 50, the two sleeves and the ring are held rigidly together to form an effective connection between the gearing on the drive hub 12 for transmitting the torque to the gearing on the driven hub 14. When assembled in the manner illustrated in the drawings, the coupling provides a relatively large pitch diameter which reduces the forces generated within the coupling and lessens the load imposed on the connecting shafts and bearings, as well as providing increased torque capacity and a relatively large reservoir for lubricant in the coupling so that the gears of the coupling will be maintained in proper lubricated condition for extended periods of time. Notwithstanding the fact that the coupling is of a relatively small diameter compared with the conventional flange-type gear coupling, a large reservoir capacity is provided. Further, the centrifugal force normally created when the shafts are rotating at a relatively high rate of speed is minimized. The coupling can easily be disassembled and serviced and repaired, if necessary, often without disturbing the optimum operating position of the drive and driven machinery connected by the coupling.

FIGS. 4 and 5 illustrate modified forms of the coupling embodying the present invention, and since the couplings of these two figures are similar in many respects to the coupling shown in FIGS. 1 through 3, like numerals will be given like parts, where applicable. The primary difference between the coupling previously described herein and those shown in FIGS. 4 and 5 is the positioning of the rings 80 and 90 externally with respect to the two sleeves. The ring 80 shown in FIG. 4 is a continuous unsegmented ring, and the screws 56 and 58 are threaded through holes in the ring and extend into unthreaded holes 82 and 84 near the inner ends of the two sleeves 28 and 30. In assembling the coupling on the drive and driven shafts, the ring is assembled on one of the sleeves and is slipped over into the overlapping position illustrated in FIG. 4 for connecting the two sleeves after the two sleeves have been moved to their operating position in contact with one another. The screws are then threaded into ring 80 and the inner ends of the screws extend into the holes in the two sleeves, thereby holding the sleeves together, and O-ring seals 86 and 88 are provided to form an effective seal between the two sleeves and the ring 80.

The embodiment of FIG. 5 is similar to that shown in FIG. 4, except that ring 90 has unthreaded holes 92 and 94, and threaded holes 96 are provided in sleeve 28 and threaded holes 98 are provided in sleeve 30. The ring 90 may be a continuous ring or a segmented ring, and when the bolts 56 and 58 have seated in the holes 92 and 94 of the ring and threaded into holes 96 and 98 of the sleeves, the two sleeves and the ring form a rigid assembly connecting the gearing of the two hubs 12 and 14.

O-ring gaskets 86 and 88 are likewise used in this embodiment to form an effective seal between the two sleeves and the connecting ring. In the embodiment of FIG. 5, the ring, if it is continuous, is assembled in the same manner as described with reference to ring 80 in FIG. 4; however, the ring may be segmented, and hence it can be placed around the sleeves after the hubs have been mounted on the shafts and the sleeves have been placed together in their operating position. In this emobodiment, as in the other embodiments, the lubrication can be added to the cavity 70, as required, through any one of the bolt holes for the two sets of bolts securing the ring and sleeves together.

FIG. 6 illustrates a variation of the couplings disclosed in the preceding figures, the coupling of FIG. 6 being, in effect, a half coupling, in which the hub, i.e. hub 14, and sleeve 30 are connected to a hub 100 mounted on a shaft in axial alignment with a shaft in bore 18 of hub 14. As illustrated in the drawings, the bore 102 in hub 100 is for a shaft of a substantially larger diameter than the shaft in hub 14. This, however, has no direct significance with respect to the concept disclosed in FIG. 6. The sleeve 30 is connected to hub 100 by a ring 104 secured to the inner edge of sleeve 30 by a plurality of bolts 106 spaced around the periphery of the sleeve. The ring 104 receives the hub 100 and is rigidly connected thereto by bolts 108 spaced around the periphery of ring 104. Seals are used between the sleeve and rings and the ring and hub as shown at numerals 110 and 112 to form cavity 114 which serves as a reservoir for lubricant after the hubs 14 and 100 have been mounted on the respective shafts. The concept illustrated in FIG. 6 has several of the same advantages as the couplings disclosed in the preceding figures, including permitting the drive and driven machinery to be placed in operating relationship with respect to one another before the coupling is connected in driving relationship with the shafts of the machinery.

The embodiment illustrated in FIG. 7 utilizes hubs 12 and 14, sleeves 28 and 30, and a spacer 120 connected at its left hand end, as viewed in FIG. 7, to sleeve 28 by a ring 122, and at the right hand end to sleeve 30 by a ring 124. Bolts 126 connect the sleeve 28 to ring 122, and bolts 128 connect the ring to the spacer, and bolts 130 connect sleeve 30 to ring 124, and bolts 132 connect the ring to the spacer. When the hubs 12 and 14 are mounted on the respective shafts, an enclosed cavity is formed to serve as a reservoir for the grease or oil for lubricating the gearing at each end of the coupling. The gear coupling of FIG. 7 can be assembled after the machinery has been placed in operative position, since the two sleeves can be mounted on the hubs and the rings and spacer connected thereto after the hubs have been secured to the respective shafts.

While several modifications and embodiments have been disclosed herein, various changes and modifications may be made without departing from the scope of the invention.

I claim:

1. A gear coupling for connecting two shafts in end-to-end relation, comprising hubs adapted to be mounted on the shafts and each having a peripheral set of gear teeth thereon, a sleeve disposed on each of said hubs and having an internal set of gear teeth meshing with the gear set on the respective hub, and ring means overlapping the adjacent edges of both of said sleeves, and radially extending securing means in the overlapping portions of said ring means and said sleeves, forming a rigid assembly of said two sleeves and said ring means for transmitting torque between the gear sets on the hubs, wherein said ring means is disposed internally with respect to said sleeves and the gear sets on said hubs are disposed on a radially extending annular rib on the periphery of said hubs.

2. A gear coupling for connecting two shafts in end-to-end relation as defined in claim 1, in which each of said sleeves has an end member which extends into close proximity to the periphery of the respective hub, and a sealing means is disposed between each of said end members and the respective hub.

3. A gear coupling for connecting two shafts in end-to-end relation as defined in claim 1, in which said sleeves are positioned in close proximity at their inner edges when the sleeves and ring means are assembled in the coupling.

4. A gear coupling for connecting two shafts in end-to-end relation as defined in claim 3, in which said ring means consists of two segments.

5. A gear coupling for connecting two shafts in end-to-end relation as defined in claim 1, in which said ring means consists of two segments.

6. A gear coupling for connecting two shafts in end-to-end relation as defined in claim 1, in which said ring means consists of two approximately equal segments, and said securing means consists of bolts extending through holes in said sleeves into threaded holes in said ring means.

7. A gear coupling for connecting two shafts in end-to-end relation as defined in claim 1, in which said ring means further includes a spacer, and an annular attachment means is disposed between said ring means at each end and the respective sleeve.

8. A gear coupling for connecting two shafts in end-to-end relation, comprising hubs adapted to be mounted on the shafts and each having a peripheral set of gear teeth thereon, a sleeve disposed on each of said hubs and having an internal set of gear teeth meshing with the gear set on the respective hub, and ring means overlapping the adjacent edges of both of said sleeves, and radially extending securing means in the overlapping portions of said ring means and said sleeves, forming a rigid assembly of said two sleeves and said ring means for transmitting torque between the gear sets on the hubs, wherein said ring means is disposed internally with respect to said sleeves and is in at least two segments.

9. A gear coupling for connecting two shafts in end-to-end relation as defined in claim 8, in which said ring means consists of two approximately equal segments, and said securing means consists of bolts extending through holes in said sleeves into threaded holes in said ring means.

10. A gear coupling for connecting two shafts in end-to-end relation as defined in claim 8, in which each of said sleeves has an end member which extends into close proximity to the periphery of the respective hub, and a sealing means is disposed between each of said end members and the respective hub.

11. A gear coupling for connecting two shafts in end-to-end relation as defined in claim 8, in which said sleeves are positioned in close proximity at their inner edges when the sleeves and ring means are assembled in the coupling.

12. A gear coupling for connecting two shafts in end-to-end relation, comprising hubs adapted to be mounted on the shafts and each having a peripheral set of gear teeth thereon, a sleeve disposed on each of said hubs and having an internal set of gear teeth meshing with the gear set on the respective hub, and ring means overlapping the adjacent edges of both of said sleeves, and radially extending securing means in the overlapping portions of said ring means and said sleeves, forming a rigid assembly of said two sleeves and said ring means for transmitting torque between the gear sets on the hubs, wherein said ring means is disposed externally with respect to said sleeves and said securing means consists of bolts extending through holes in said ring means and threaded into holes in said sleeves.

13. A gear coupling for connecting two shafts in end-to-end relation as defined in claim 12, in which said ring means comprising at least two segments.

14. A gear coupling for connecting two shafts in end-to-end relation as defined in claim 12, in which each of said sleeves has an end member which extends into close proximity to the periphery of the respective hub, and a sealing means is disposed between each of said end members and the respective hub.

15. A gear coupling for connecting two shafts in end-to-end relation as defined in claim 12, in which said sleeves are positioned in close proximity at their inner edges when the sleeves and ring means are assembled in the coupling.

* * * * *